(12) United States Patent
Kawazu et al.

(10) Patent No.: US 10,889,167 B2
(45) Date of Patent: Jan. 12, 2021

(54) SUNROOF DEVICE

(71) Applicant: AISIN SEIKI KABUSHIKI KAISHA, Kariya (JP)

(72) Inventors: Aisei Kawazu, Chiryu (JP); Ryuta Fukada, Kariya (JP); Akinori Osamura, Chiryu (JP)

(73) Assignee: Aisin Seiki Kabushiki Kaisha, Kariya (JP)

( * ) Notice: Subject to any disclaimer, the term of this patent is extended or adjusted under 35 U.S.C. 154(b) by 7 days.

(21) Appl. No.: 16/381,672

(22) Filed: Apr. 11, 2019

(65) Prior Publication Data

US 2019/0315206 A1    Oct. 17, 2019

(30) Foreign Application Priority Data

Apr. 13, 2018 (JP) ................... 2018-077575

(51) Int. Cl.
*B60J 7/043* (2006.01)
*B60J 7/02* (2006.01)

(52) U.S. Cl.
CPC ............... *B60J 7/0435* (2013.01); *B60J 7/02* (2013.01)

(58) Field of Classification Search
CPC ............. B60J 7/0435; B60J 7/02; B60J 7/047
USPC ............................. 206/216.02–216.05, 220.01
See application file for complete search history.

(56) References Cited

U.S. PATENT DOCUMENTS

| | | | | |
|---|---|---|---|---|
| 4,114,945 A | * | 9/1978 | Lutz | B60J 7/02 16/93 R |
| 4,811,925 A | * | 3/1989 | Fujita | B60N 2/0707 248/430 |
| 4,944,606 A | * | 7/1990 | Lindsey | F16C 33/20 384/42 |
| 6,763,550 B2 | * | 7/2004 | Regnier | E05F 11/382 16/193 |
| 6,799,796 B2 | * | 10/2004 | Radmanic | B60J 7/02 296/216.08 |
| 8,459,730 B2 | | 6/2013 | Sawada et al. | |
| 9,579,958 B2 | | 2/2017 | Ide | |
| 10,023,032 B2 | | 7/2018 | Knoepfle et al. | |

FOREIGN PATENT DOCUMENTS

| | | |
|---|---|---|
| DE | 10 2014 018 285 A1 | 6/2016 |
| JP | 2012-153336 | 8/2012 |
| JP | 2016-104612 | 6/2016 |

* cited by examiner

*Primary Examiner* — Dennis H Pedder
(74) *Attorney, Agent, or Firm* — Finnegan, Henderson, Farabow, Garrett & Dunner, LLP

(57) ABSTRACT

A sunroof device includes a panel bracket that holds a movable panel capable of opening and closing an opening portion disposed to a roof panel, a guide portion that is disposed to the panel bracket, and a sliding bracket that slidably engages with the guide portion. Further, the sunroof device includes a rear link, serving as a support member, that, while being coupled to the panel bracket via the sliding bracket and thereby changing a coupling position thereof with the panel bracket according to an opening-and-closing movement position of the movable panel, supports the panel bracket. On a sliding contact surface of the panel bracket with the guide portion of the panel bracket, a plurality of groove portions extending in a sliding direction of the sliding bracket along the guide portion are disposed.

10 Claims, 8 Drawing Sheets

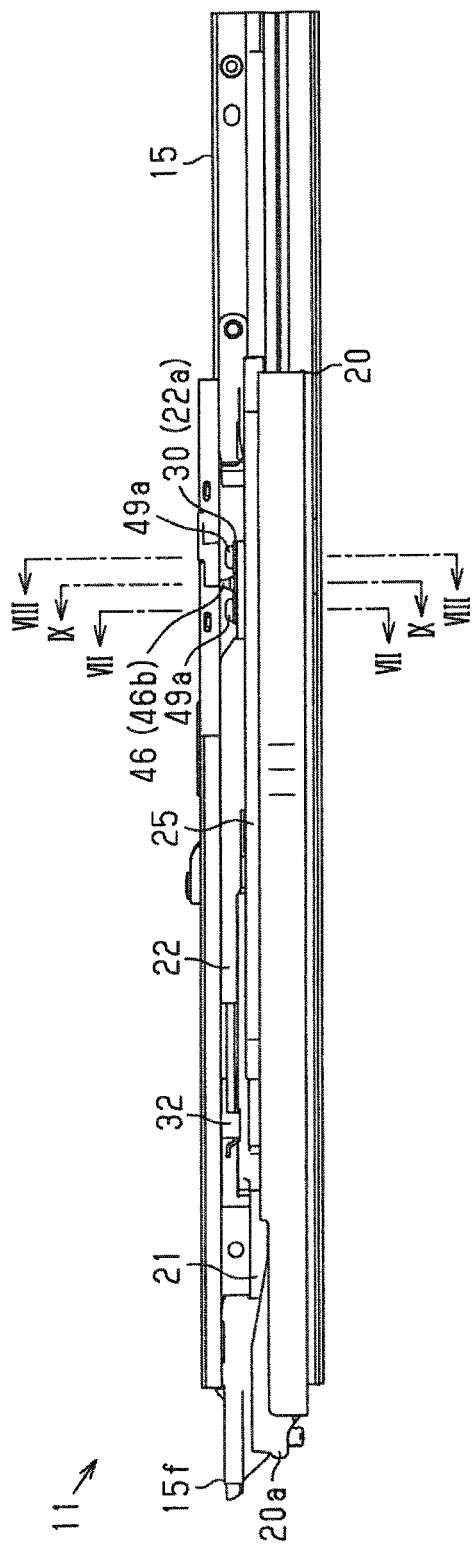
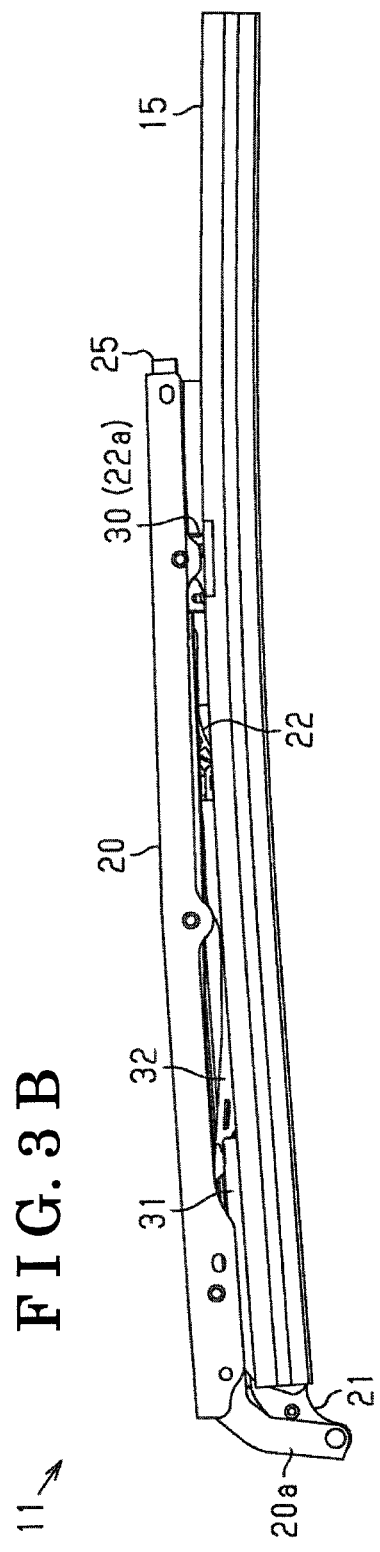
FIG. 3A
FIG. 3B

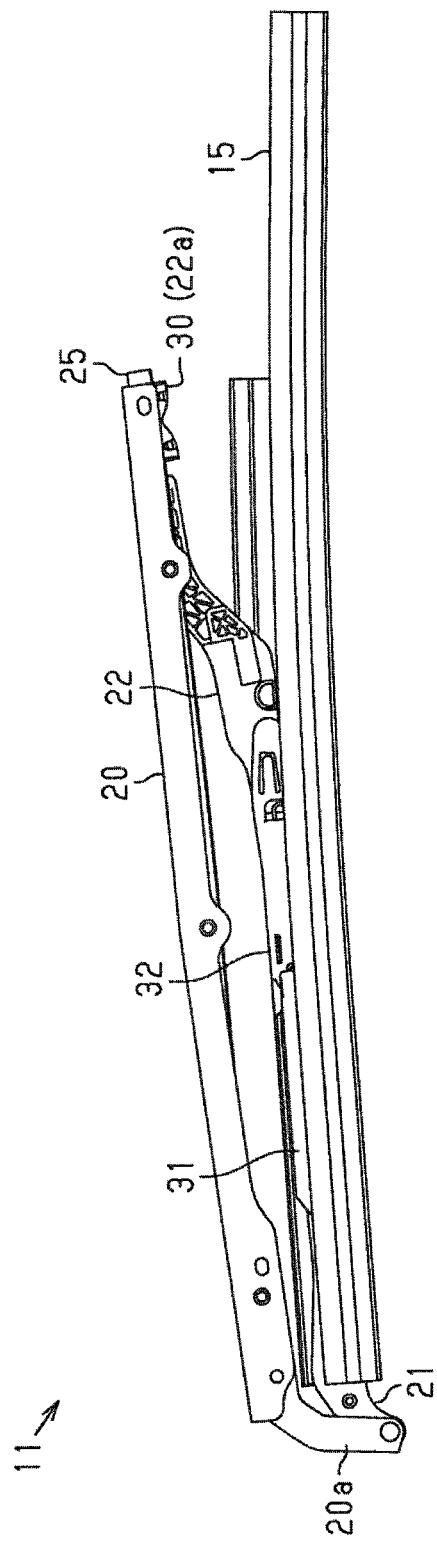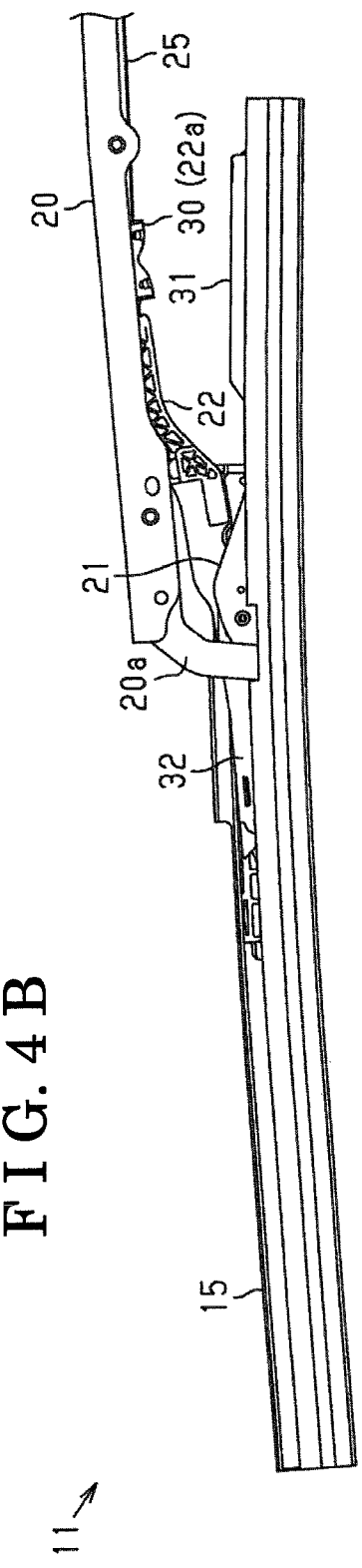

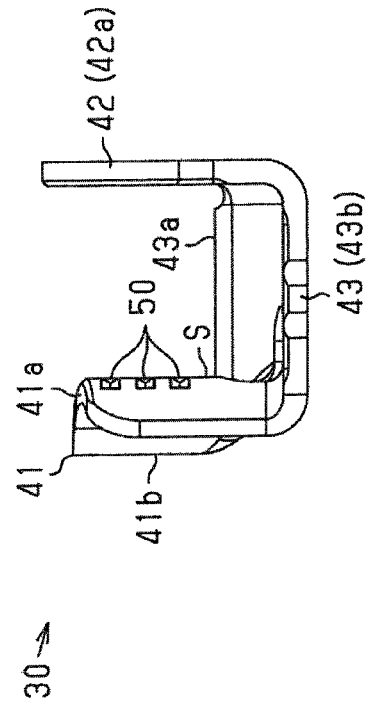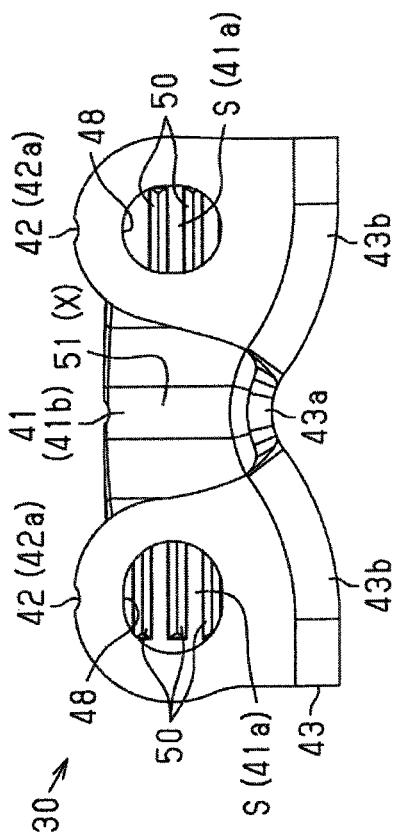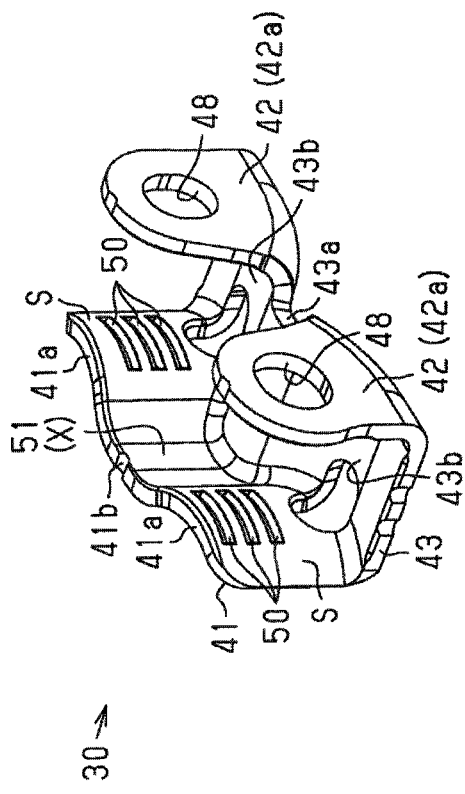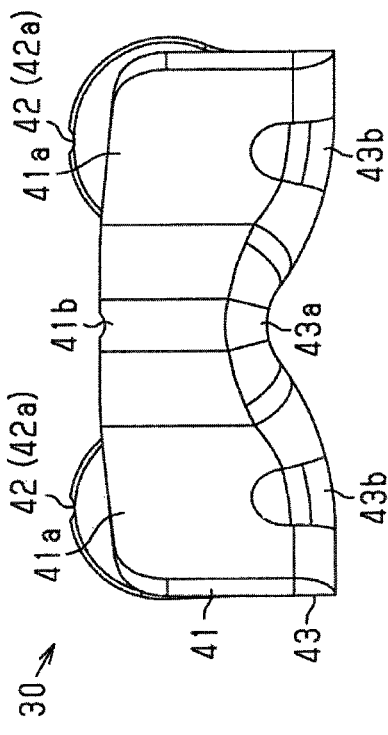

SUNROOF DEVICE

CROSS REFERENCE TO RELATED APPLICATIONS

This application is based on and claims priority under 35 U.S.C. § 119 to Japanese Patent Application 2018-077575, filed on Apr. 13, 2018, the entire content of which is incorporated herein by reference.

TECHNICAL FIELD

This disclosure generally relates to a sunroof device.

BACKGROUND DISCUSSION

In general, a sunroof device for a vehicle is provided with panel brackets that hold a movable panel, which is capable of opening and closing an opening portion disposed to a roof panel, and supporting members that support the panel brackets. Conventionally, such sunroof devices include a sunroof device in which, via sliding brackets that slidably engage with guide portions disposed to panel brackets, support members are respectively coupled to the panel brackets. In such a sunroof device, the movable panel is configured to perform opening and closing movement with coupling positions between panel brackets and support members, that is, support points of the panel brackets by the support members, changing based on sliding movement of the sliding brackets (see, for example, DE 10 2014 018 285 A (Reference 1) and JP 2016-104612 A (Reference 2)).

However, the sliding brackets, which support a load of the movable panel while engaging with the panel brackets, are required to have a solid engagement state with the guide portions of the panel brackets. Therefore, the sliding bracket is likely to have a structure that causes a sliding contact surface thereof to be forcefully pressed against the guide portion. Since there is a possibility that increase in sliding resistance caused by the above-described structure of the sliding bracket becomes a cause for hindrance to smooth opening and closing movement of the movable panel, room for improvement has been left in terms of this point.

A need thus exists for a sunroof device which is not susceptible to the drawback mentioned above.

SUMMARY

A sunroof device includes a panel bracket that has a guide portion extending in an opening-and-closing movement direction of a movable panel capable of opening and closing an opening portion disposed to a roof panel and that holds the movable panel, a sliding bracket that slidably engages with the guide portion, and a support member that, while being coupled to the panel bracket via the sliding bracket and thereby changing a coupling position of the support member with the panel bracket according to an opening-and-closing movement position of the movable panel, supports the panel bracket. On a sliding contact surface of the sliding bracket with the guide portion, a plurality of groove portions extending in a sliding direction of the sliding bracket along the guide portion are disposed.

A sunroof device includes a panel bracket that has a guide portion extending in an opening-and-closing movement direction of a movable panel capable of opening and closing an opening portion disposed to a roof panel and that holds the movable panel, a sliding bracket that slidably engages with the guide portion, and a support member that, while being coupled to the panel bracket via the sliding bracket and thereby changing a coupling position of the support member with the panel bracket according to an opening-and-closing movement position of the movable panel, supports the panel bracket. On a sliding surface on the guide portion side on which the sliding bracket moves in a sliding contact state, a plurality of groove portions extending in an extending direction of the sliding surface are disposed.

According to this disclosure, it is possible to cause a movable panel to perform opening and closing movement more smoothly.

BRIEF DESCRIPTION OF THE DRAWINGS

The foregoing and additional features and characteristics of this disclosure will become more apparent from the following detailed description considered with the reference to the accompanying drawings, wherein:

FIGS. 3A and 3B are a plan view and a side view of the sunroof device (in the full close state), respectively;

FIGS. 4A and 4B are side views of the sunroof device (in a tilt open state and a slide open state, respectively);

FIGS. 6A to 6D are a perspective view of a sliding bracket, a front view of the sliding bracket, a side view of the sliding bracket (viewed from an inner side in a vehicle width direction), and another side view of the sliding bracket (viewed from an outer side in the vehicle width direction), respectively;

DETAILED DESCRIPTION

An embodiment of a sunroof device disclosed here will be explained with reference to the attached drawings.

Figure 1:
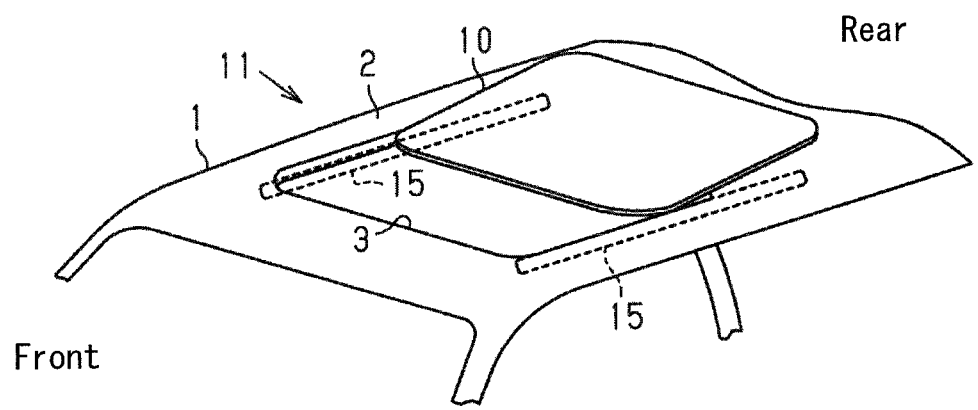
FIG. 1 is a schematic configuration diagram of a sunroof device.
Figure 2:
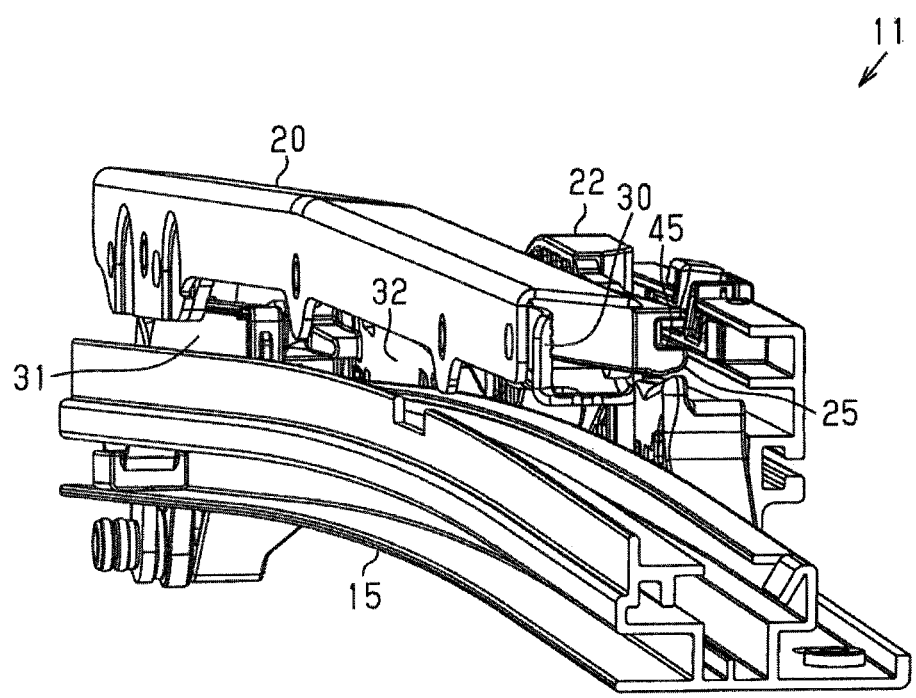
FIG. 2 is a perspective view of the sunroof device (in a full close state)

As illustrated in FIG. 1, to an opening portion 3 formed on a roof panel 2 of a vehicle 1, a movable panel 10 that is capable of opening and closing the opening portion 3 and is formed in a substantially flat plate shape is disposed. The vehicle 1 of the embodiment is provided with a sunroof device 11 that, by using a not-illustrated motor as a driving source, causes the movable panel 10 to perform opening and closing movement.

As illustrated in FIGS. 2 to 5, the sunroof device 11 of the embodiment includes a pair of guide rails 15 that extend in a vehicle longitudinal direction on both end sides in a width direction of the opening portion 3, which is formed to the roof panel 2 (see FIG. 1). The sunroof device 11 of the embodiment also includes a pair of panel brackets 20 that, while being supported above the pair of guide rails 15, are respectively fixed to end portions in a width direction of the movable panel 10. The sunroof device 11 of the embodiment is configured in such a way that movement of the panel brackets 20 along the respective guide rails 15 causes the movable panel 10 both sides of which in a vehicle, width direction are supported by the respective panel brackets 20 to perform opening and closing movement in the vehicle longitudinal direction.

Note that, in the sunroof device 11 of the embodiment, the respective guide rails 15, the respective panel brackets 20, and a support structure and a driving mechanism of the respective panel brackets 20 have bilaterally symmetrical configurations. For this reason, in FIGS. 2 to 5 and each of the drawings referred to in the following explanation, it is assumed that either of the right and left sides of the configuration will be illustrated.

Specifically, the sunroof device 11 of the embodiment includes a front link 21 and a rear link 22 which are slidably coupled to one of the guide rails 15. The front link 21 and the rear link 22 are coupled to one of the panel brackets 20 which extend in the vehicle longitudinal direction (a right-and-left direction in FIGS. 3 and 4), at positions spaced apart from each other. The sunroof device 11 of the embodiment is configured in such a way that the panel brackets 20 which, while holding the movable panel 10, move in the vehicle longitudinal direction are stably supported by this configuration.

More specifically, the panel bracket 20 of the embodiment has a coupling portion 20a that extends downward (toward a lower side in FIGS. 3B and 4) from a front end portion of the panel bracket 20. The front link 21 of the embodiment, while extending toward a vehicle front side (a left side in FIGS. 3 and 4) from a coupling position thereof to the guide rail 15, is rotatably coupled to the coupling portion 20a.

In the sunroof device 11 of the embodiment, on both end portions in a width direction of the panel bracket 20, a guide portion 25 is disposed that extends in an opening-and-closing movement direction (the vehicle longitudinal direction and, in FIGS. 3 and 4, the right-and-left direction) of the movable panel 10 held by the panel bracket 20. Further, the sunroof device 11 of the embodiment includes a sliding bracket 30 which slidably engages with the guide portion 25. The rear link 22 of the embodiment, while extending toward the vehicle rear side (the right side in FIGS. 3 and 4) from the coupling position thereof to the guide rail 15, is coupled to the sliding bracket 30.

In other words, the rear link 22 of the embodiment is configured to, by being coupled to the panel bracket 20 via the sliding bracket 30, have the coupling position thereof to the panel bracket 20 movable based on sliding movement of the sliding bracket 30. The sunroof device 11 of the embodiment is configured in such a way that, while entailing change in the coupling position, that is, a support point of the panel bracket 20 by the rear link 22, the movable panel 10 held by the panel bracket 20 performs opening and closing movement.

Further more specifically, the sunroof device 11 of the embodiment includes a driving shoe 31 that, by being driven by a not illustrated motor while being coupled to the guide rail 15, slides in the vehicle longitudinal direction along an extending direction of the guide rail 15. Further, in the sunroof device 11 of the embodiment, in an interlocking manner with movement of the driving shoe 31, the front link 21 and the rear link 22 described above slide on the guide rail 15 in the vehicle longitudinal direction. With this configuration, the sunroof device 11 of the embodiment is configured to cause the movable panel 10 to perform opening and closing movement integrally with the panel bracket 20 supported by the front link 21 and the rear link 22.

Figure 5A:
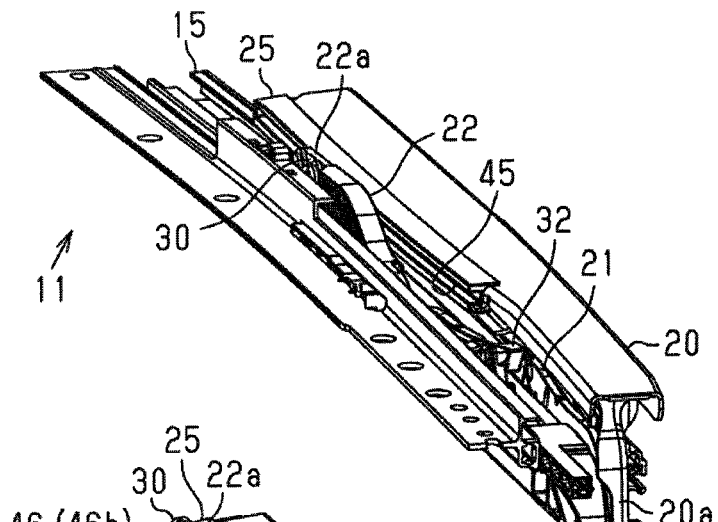
FIGS. 5A to 5C are perspective views of the sunroof device (in the full close state, the tilt open state, and the slide open state, respectively)

Specifically, as illustrated in FIGS. 3A, 3B, and 5A, the sunroof device 11 of the embodiment has the panel bracket 20 supported by the front link 21 and the rear link 22, being arranged substantially in parallel with the guide rail 15 when the driving shoe 31 is positioned in a vicinity of a front end portion 15f of the guide rail 15. With this configuration, the sunroof device 11 of the embodiment is configured to be in a full close state in which the movable panel 10 held by the panel brackets 20 closes the opening portion 3 formed on the roof panel 2.

Figure 5B:
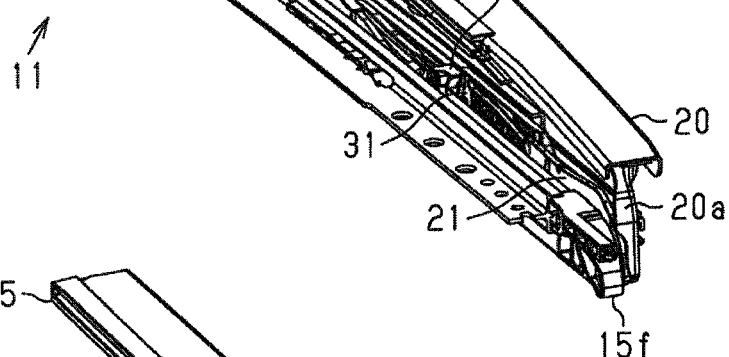

As illustrated in FIGS. 4A and 5B, in the sunroof device 11 of the embodiment, rearward movement of the driving shoe 31 from the full close position first causes the rear link 22 coupled to the panel bracket 20, to rotate in a direction in which the rear link 22 rises (a counter clock-wise direction in FIGS. 3 and 4) in an interlocking manner with a check block 32 disposed on the guide rail 15. Then, with this configuration, the movable panel 10 is configured to perform opening movement (tilt opening movement) in such a way that a rear end side thereof is lifted up.

Figure 5C:
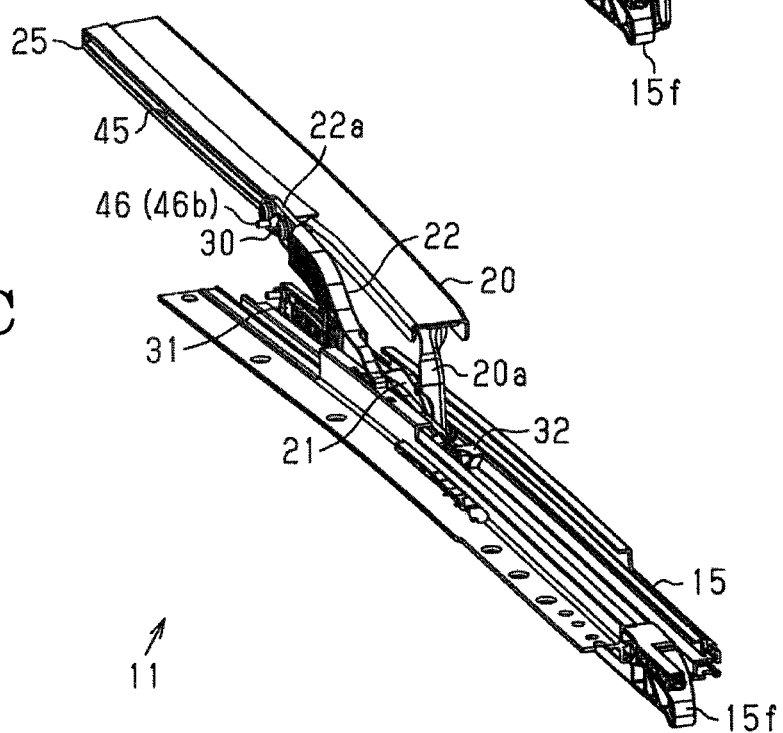

Further, as illustrated in FIGS. 4B and 5C, in the sunroof device 11 of the embodiment, further rearward movement of the driving shoe 31 from this state causes the front link 21 and the rear link 22 supporting the panel bracket 20, to move rearward. The front link 21 of the embodiment moves rearward while lifting a front end side of the panel bracket 20 to which a tip portion of the front link 21 is coupled, upward (toward an upper side in FIGS. 3 and 4). On this occasion, the front link 21 moves rearward in such a way as to come close to the rear link 22 positioned on a rear side of the front link 21. Further, based on a change in a relative position of the front link 21 to the rear link 22, the sliding bracket 30, which engages with the guide portion 25 of the panel bracket 20, slides to a front end side of the guide portion 25. With this configuration, the sunroof device 11 of the embodiment is configured in such a way that, while the frontward movement of the sliding bracket 30 changes a support point of the panel bracket 20 by the rear link 22 to the front end side, the movable panel 10 held by the panel brackets 20 further performs opening movement (slide opening movement).

In the sunroof device 11 of the embodiment, frontward movement of the driving shoe 31 from this state causes the front link 21 and the rear link 22 supporting the panel bracket 20, to move frontward. On this occasion, the front link 21 moves frontward in such a way as to move away from the rear link 22. Further, based on a change in a relative position of the front link 21 to the rear link 22, the sliding bracket 30, which engages with the guide portion 25 of the panel bracket 20, slides to a rear end side of the guide portion 25. With this configuration, the sunroof device 11 of the embodiment is configured in such a way that, while the rearward movement of the sliding bracket 30 changes a support point of the panel bracket 20 by the rear link 22 to the rear end side, the movable panel 10 held by the panel brackets 20 performs slide closing movement and, subsequently, further performs tilt closing movement, and thereby being brought to the full close state again.

(Sliding Bracket)

Next, in the sunroof device 11 of the embodiment configured as described above, the sliding bracket 30 interposed between the rear link 22 and the panel bracket 20 which serve as support members of the sunroof device 11, will be explained.

As illustrated in FIGS. 6A to 6D and 7 to 9, in the sunroof device 11 of the embodiment, the sliding bracket 30 has an outer shape having a substantially U-shaped cross section. The guide portion 25 disposed to the panel bracket 20 has a long, substantially rectangular column-shaped outer shape that extends in the opening-and-closing movement direction of the movable panel 10 held by the panel brackets 20, that is, the vehicle longitudinal direction (see FIG. 5). The sliding bracket 30 of the embodiment is configured to engage with the guide portion 25 of the panel bracket 20 from underneath.

More specifically, the sliding bracket 30 of the embodiment includes a first sidewall portion 41 that, by engagement of the sliding bracket 30 with the guide portion 25 of the panel bracket 20, is arranged on an inner side in the vehicle width direction (the left side in FIGS. 7 to 9) with respect to the guide portion 25 of the panel bracket 20. In the sliding bracket 30 of the embodiment, the first sidewall portion 41 is formed in a corrugated plate shape in which a mountain portion 41a and a valley portion 41b are alternately arranged along an extending direction of the guide portion 25 (the right-and-left direction in FIGS. 6C and 6D), which serves as the sliding direction of the sliding bracket 30.

Specifically, when it is assumed that a portion protruding to the guide portion 25 side (the right side in FIGS. 7 to 9) and a portion going away from the guide portion 25 are the mountain portion 41a and the valley portion 41b, respectively, the first sidewall portion 41 has a corrugated plate shape with two of the mountain portions 41a sandwiching the valley portion 41b. The sliding bracket 30 of the embodiment also includes a second sidewall portion 42 arranged on an outer side in the vehicle width direction (the right side in FIGS. 7 to 9) with respect to the guide portion 25 of the panel bracket 20. In the sliding bracket 30 of the embodiment, the second sidewall portion 42 is constituted of a pair of plate-shaped portions 42a that respectively face the mountain portions 41a in the above-described first sidewall portion 41. The sliding bracket 30 of the embodiment also includes a bottom wall portion 43 that connects between the first and second sidewall portions 41 and 42.

In the sliding bracket 30 of the embodiment, the bottom wall portion 43 is formed in a corrugated plate shape that includes valley portions 43b at positions corresponding to the respective mountain portions 41a in the first sidewall portion 41 and a mountain portion 43a at a position corresponding to the valley portion 41b in the first sidewall portion 41. Further, the sliding bracket 30 of the embodiment engages with the guide portion 25 of the panel bracket 20 in such a way that the mountain portion 43a of the bottom wall portion 43 comes into contact with the guide portion 25 from underneath. The guide portion 25 of the embodiment includes a protruding line portion 44 that is disposed in such a way as to protrude downward from a lower surface 25c of the guide portion 25 and extends in the extending direction of the guide portion 25. With this configuration, the sunroof device 11 of the embodiment is configured to reduce a contact area between the guide portion 25 of the panel bracket 20 and the bottom wall portion 43 of the sliding bracket 30 and thereby reduce sliding resistance therebetween.

Further more specifically, the guide portion 25 of the embodiment has a guide groove 45 that, while opening to an outer side in the vehicle width direction, extends along the extending direction of the guide portion 25. Meanwhile, to a tip portion of the rear link 22, a connection portion 22a that has a substantially flat plate shape is disposed. To the connection portion 22a, a shaft-shaped member 46 that slidably engages with the guide groove 45 disposed to the guide portion 25, is disposed.

Figure 9:
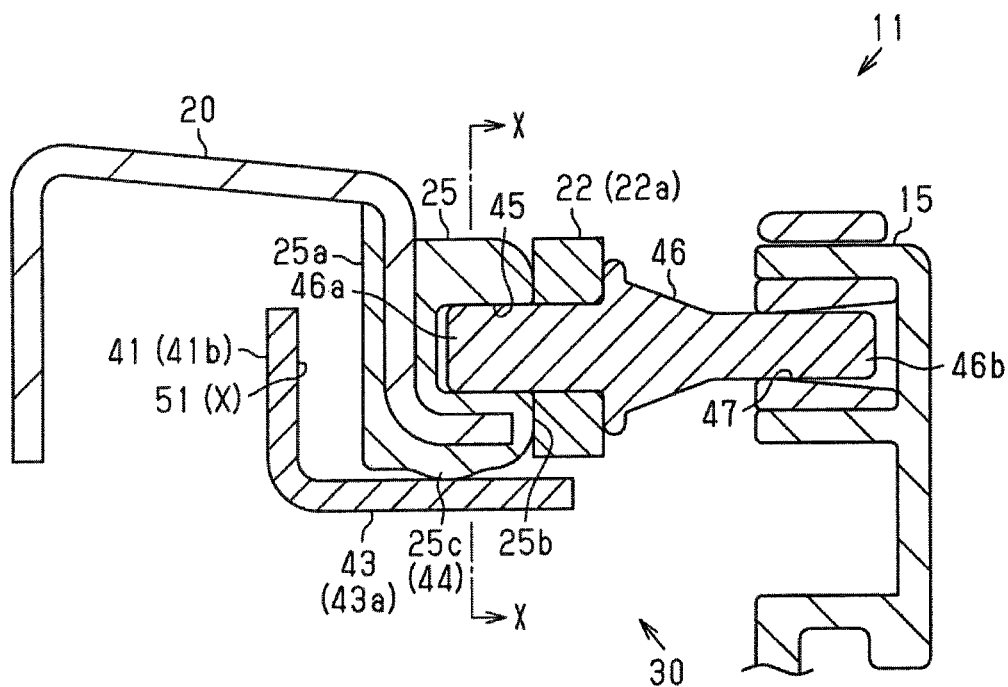
FIG. 9 is still another cross-sectional view of the sunroof device (a cross-sectional view taken along a line IX-IX in FIG. 3A)
Figure 10:
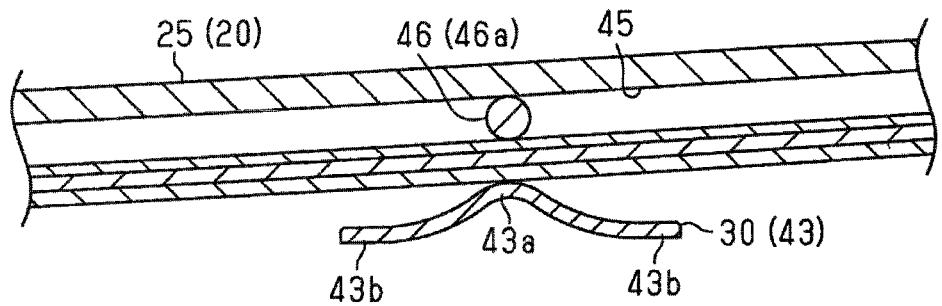
FIG. 10 is still another cross-sectional view of the sunroof device (a cross-sectional view taken along a line X-X in FIG. 9)

Specifically, as illustrated in FIGS. 9 and 10, in the sunroof device 11 of the embodiment, the shaft-shaped member 46 is fixed to the connection portion 22a in such a way as to penetrate the connection portion 22a in a thickness direction and thereby extends in the vehicle width direction (the right-and-left direction in FIG. 9 and the direction orthogonal to the paper surface in FIG. 10). With this configuration, the sunroof device 11 of the embodiment is configured in such a way that a first shaft end portion 46a of the shaft-shaped member 46, which protrudes to an inner side in the vehicle width direction (the left side in FIG. 9) from the connection portion 22a of the rear link 22, is inserted into the guide groove 45 of the guide portion 25.

Further, the shaft-shaped member 46 of the embodiment has a second shaft end portion 46b, which protrudes to the outer side in the vehicle width direction (the right side in FIG. 9) from the connection portion 22a of the rear link 22, being inserted into a guide groove 47 disposed to the guide portion 15. With this configuration, the sunroof device 11 of the embodiment is configured to ensure stable movement of the rear links 22.

Figure 7:
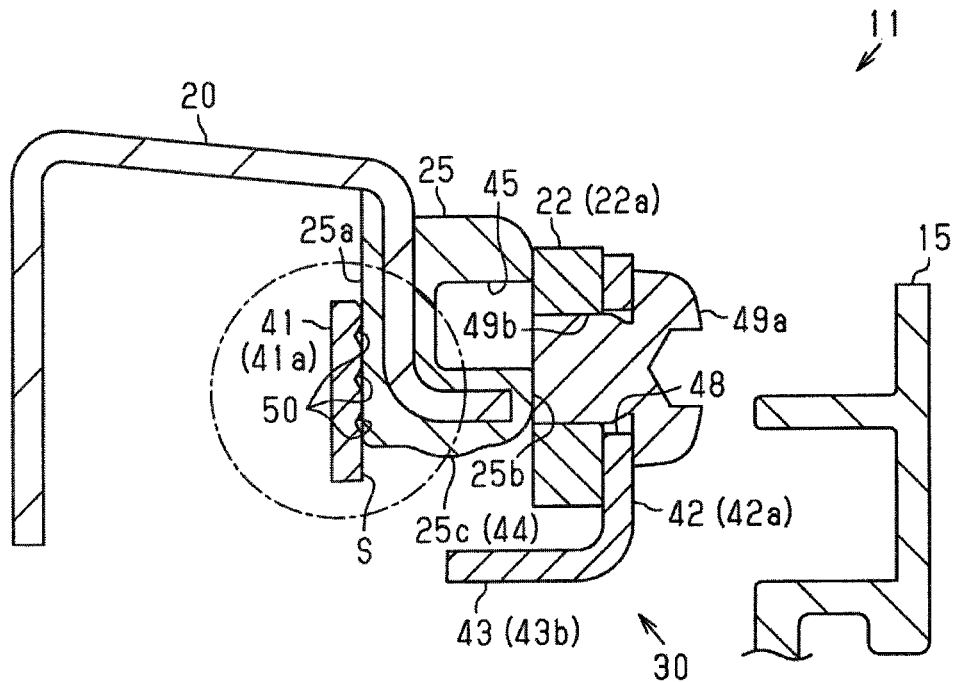
FIG. 7 is a cross-sectional view of the sunroof device (a cross-sectional view taken along a line VII-VII in FIG. 3A)
Figure 8:
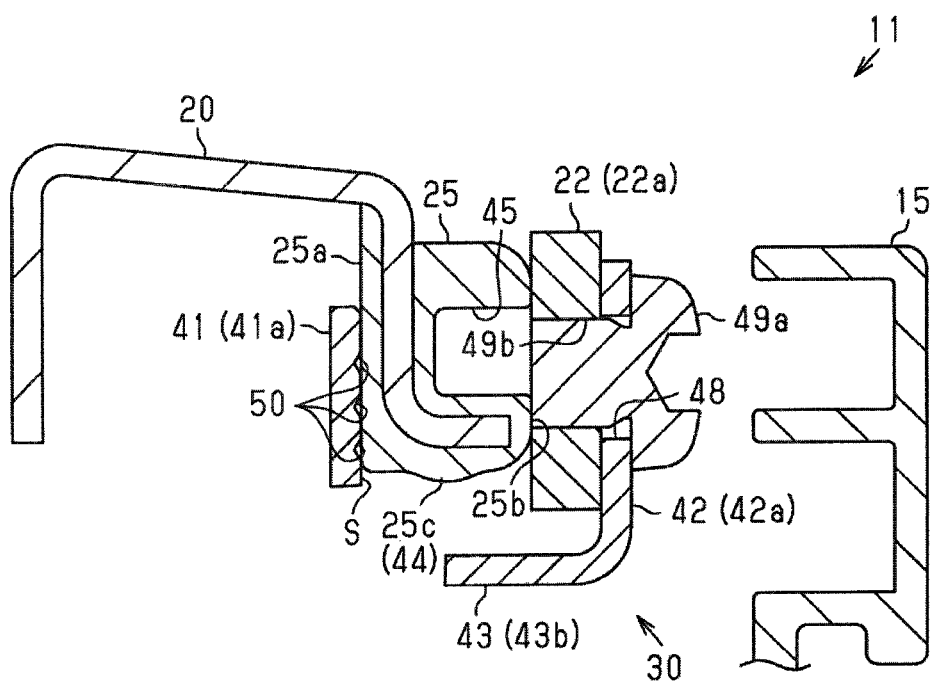
FIG. 8 is another cross-sectional view of the sunroof device (a cross-sectional view taken along a line VIII-VIII in FIG. 3A)

As illustrated in FIGS. 7 and 8, the sliding bracket 30 of the embodiment engages with the guide portion 25 in such a way that the connection portion 22a is sandwiched between the second sidewall portion 42 and a second side surface 25b of the guide portion 25. Specifically, to the sliding bracket 30 of the embodiment, hole portions 48 that penetrate the respective plate-shaped portions 42a constituting the second sidewall portion 42 of the sliding bracket 30 are disposed. Further, to the connection portion 22a of the rear link 22, threaded holes 49b into which screw members 49a inserted into the respective hole portions 48 of the sliding bracket 30 screw are disposed. The sliding bracket 30 of the embodiment is configured to, based on fastening force between the respective screw members 49a and threaded holes 49b, couple the connection portion 22a of the rear link 22 with the guide portion 25 of the panel bracket 20.

Figure 11:
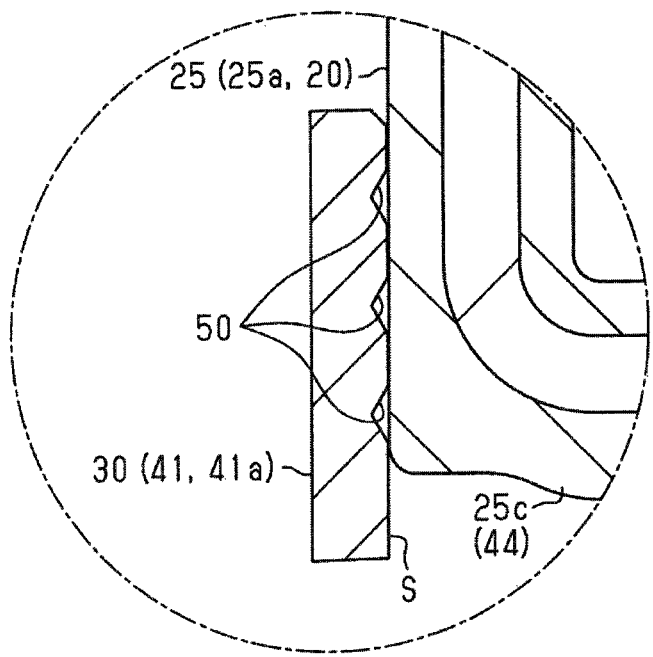
FIG. 11 is an enlarged cross-sectional view of a vicinity of groove portions disposed on a sliding contact surface of the sliding bracket.
Figure 12:
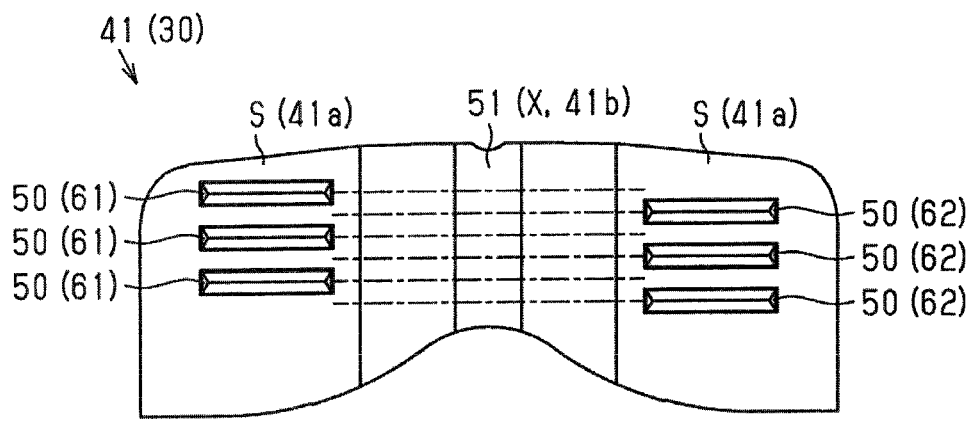
FIG. 12 is a front view of the sliding contact surface.

As illustrated in FIGS. 6, 11, and 12, the sliding bracket 30 of the embodiment includes a plurality of groove portions 50 that extend in the sliding direction of the sliding bracket 30 (a direction orthogonal to the paper surface in FIG. 11 and the right-and-left direction in FIG. 12) on the first sidewall portion 41, which constitutes a sliding contact surface S coming into sliding contact with the first side surface 25a of the guide portion 25.

Specifically, in the sliding bracket 30 of the embodiment, the groove portions 50 are disposed on the respective mountain portions 41a of the first sidewall portion 41 which comes into sliding contact with the first side surface 25a of the guide portion 25. In the sliding bracket 30 of the embodiment, each of the groove portions 50 is formed using so-called metal stamping processing (engraving processing) and is thereby formed in a substantially triangular cross-section. Each of the groove portions 50 is arranged in a set including a plurality of (three in the embodiment) groove portions 50 on each mountain portion 41a of the first sidewall portion 41 in such a way as to be lined up in an up-and-down direction, that is, in a direction crossing (orthogonal to) the direction in which the sliding bracket 30 slides with the guide portion 25. With this configuration, the sliding bracket 30 of the embodiment is configured to reduce a contact area between the first sidewall portion 41 and (the first side surface 25a of) the guide portion 25 of the panel bracket 20 and thereby reduce sliding resistance therebetween.

The sliding bracket 30 of the embodiment is also configured to interpose not-illustrated lubricant (grease) X between the first sidewall portion 41 serving as the sliding contact surface S and (the first side surface 25a of) the guide portion 25. Further, in the sliding bracket 30 of the embodiment, a gap formed between the valley portion 41b of the first sidewall portion 41 which has a corrugated plate shape, and the first side surface 25a of the guide portion 25 constitutes a storage portion (oil reservoir) 51 for the lubricant X. Each of the groove portions 50 of the embodiment is disposed in such a way as to extend from the storage portion 51 in the sliding direction of the sliding bracket 30.

In other words, in the sunroof device 11 of the embodiment, the sliding bracket 30 sliding along the extending direction of the guide portion 25 in appearance causes the lubricant X reserved in the storage portion 51 to be applied to the first side surface 25a of the guide portion 25 by way of the groove portions 50. In other words, in the sliding bracket 30 of the embodiment, the groove portions 50 form supply paths for the lubricant X reserved in the storage portion 51. With this configuration, the sunroof device 11 of the embodiment is configured in such a way that the sliding bracket 30 which engages with the guide portion 25 of the panel bracket 20 more smoothly slides.

Figure 13:
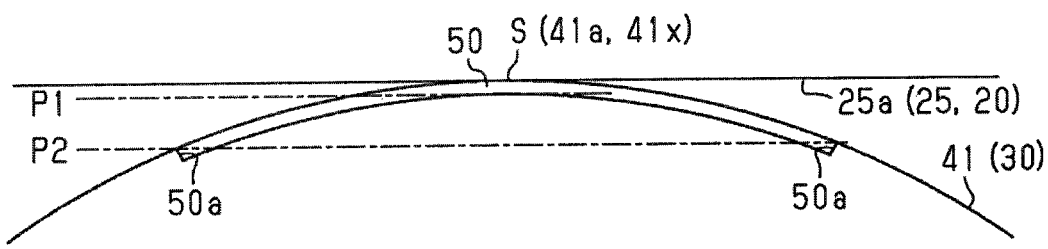
FIG. 13 is an explanatory diagram illustrating a shape of a groove portion disposed on the sliding contact surface.

Further more specifically, as illustrated in FIG. 13, each of the groove portions 50 of the embodiment is extended in the sliding direction of the sliding bracket 30 in such a way that an opening position P2 at an extension end 50a of the groove portion 50 is arranged spaced further apart from the first side surface 25a of the guide portion 25 than a bottom position P1 of the groove portion 50 at an apex 41x of the mountain portion 41a on which the groove portion 50 is formed. This configuration enables the sliding bracket 30 of the embodiment to efficiently supply the groove portions 50 with the lubricant X reserved in the valley portion 41b of the first sidewall portion 41.

As illustrated in FIG. 12, on the sliding bracket 30 of the embodiment, first directional groove portions 61 that extend toward one side in the sliding direction (the left side in FIG. 12) from the storage portion 51 for the lubricant X and second directional groove portions 62 that extend toward the other side in the sliding direction (the right side in FIG. 12) are respectively formed at sets of positions that are displaced from each other in a direction (the up-and-down direction in FIG. 12) crossing the sliding direction. This configuration enables the lubricant X which is supplied by way of the groove portions 50 to be utilized more effectively.

In other words, the sliding bracket 30 of the embodiment slides along the extending direction of the guide portion 25 and thereby applies the lubricant X in the groove portions 50 to the first side surface 25a of the guide portion 25, with which the first sidewall portion 41 comes into sliding contact, on the opposite side (a rear side in the sliding direction) to the relative movement direction of the sliding bracket 30 with respect to the guide portion 25. Relative movement of the sliding bracket 30 toward the opposite side to the sliding direction at the time of application of the lubricant X causes the lubricant X to be retrieved to the groove portions 50 that move at the same sliding positions (positions in the up-and-down direction) as those at the time of application of the lubricant X.

On this occasion, application of the lubricant X supplied by way of the groove portions 50 to the first side surface 25a of the guide portion 25 causes some percentage of the lubricant X to spill in the up-and-down direction from positions at which the lubricant X was applied. The arrangement of the groove portions 50 causes the spilled lubricant X to be retrieved to the groove portions 50 moving at positions that are different from and mutually adjacent in the up-and-down direction to positions at the time of lubricant application.

In other words, the lubricant X in the groove portions 50, while migrating between the respective groove portions 50 adjacent in the up-and-down direction to each other, gradually spills to an outside from an upper end side and a lower end side of the first sidewall portion 41 which constitutes the sliding contact surface S with the guide portion 25.

However, arrangement of the groove portions 50 formed on one of the mountain portions 41a of the first sidewall portion 41 and the groove portions 50 formed on the other of the mountain portions 41a at sets of positions that are displaced from each other in the up-and-down direction enables positions at which the groove portions 50 relatively move in the sliding direction in association with sliding of the sliding bracket 30, to be set densely in the up-and-down direction in which the respective groove portions 50 are lined up and which crosses the sliding direction. With this configuration, the sunroof device 11 of the embodiment is configured to enable application and retrieval of the lubricant X by way of the groove portions 50 to be performed finely and thereby enables the lubricant X to be used over a long period.

Next, advantageous effects of the embodiment will be explained.

(1) The sunroof device 11 includes the panel brackets 20 that hold the movable panel 10 capable of opening and closing the opening portion 3 disposed to the roof panel 2, the guide portions 25 disposed to the panel brackets 20, and the sliding brackets 30 that slidably engage with the guide portions 25. Further, the sunroof device 11 includes the rear links 22 serving as support members, each of which, while being coupled to one of the panel brackets 20 via one of the sliding brackets 30 and thereby changing a coupling position thereof with the panel bracket 20 according to an opening-and-closing movement position of the movable panel 10, supports the panel bracket 20. On the sliding contact surface S of the sliding bracket 30 with the guide portion 25 of the panel bracket 20, a plurality of the groove portions 50 extending in the sliding direction of the sliding bracket 30 along the guide portion 25 are disposed.

The configuration described above enables an area with which the sliding contact surface S of the sliding bracket 30 comes into contact with the guide portion 25 of the panel bracket 20, to be reduced, and sliding resistance between the sliding contact surface S and the guide portion 25 to be thereby reduced. With this configuration, it is possible to cause the movable panel 10 to perform opening and closing movement more smoothly.

(2) The sliding bracket 30 includes the first sidewall portion 41 serving as a wall portion that has a corrugated plate shape in which the mountain portions 41a and the valley portion 41b are alternately arranged in the sliding direction. The respective mountain portions 41a of the first sidewall portion 41 form the sliding contact surface S coming into sliding contact with the guide portion 25.

The configuration described above causes the sliding bracket 30 to engage with the guide portion 25, with the sliding contact surface S of the sliding bracket 30 with the guide portion 25 being in a line contact state along a line extending in the up-and-down direction, that is, a line extending in a direction crossing the sliding direction of the sliding bracket 30 with the guide portion 25. With this configuration, it is possible to secure a stable engagement state with the guide portion 25 and therewith further reduce sliding resistance of the sliding bracket 30. As a result, it is possible to cause the movable panel 10 to perform opening and closing movement more smoothly.

(3) In the sliding bracket 30, a gap formed between the valley portion 41b of the first sidewall portion 41 and the guide portion 25 constitutes the storage portion 51 for the lubricant X. Further, the groove portions 50 are formed on the mountain portions 41a of the first sidewall portion 41. The groove portions 50 are formed in such a way as to extend from the storage portion 51 for the lubricant X in the sliding direction of the sliding bracket 30.

In other words, interposing the lubricant X to the sliding contact surface S enables sliding resistance of the sliding bracket 30 to be further reduced. Further, the configuration described above causes the groove portions 50 to function as supply paths for the lubricant X reserved in the storage portion 51. With this configuration, it is possible to cause the movable panel 10 to perform opening and closing movement more smoothly.

(4) The groove portions 50 are formed on two mountain portions 41a that are positioned on both sides in the sliding direction with the valley portion 41b, which serves as the storage portion 51 for the lubricant X, interposed therebetween. This configuration causes a set of groove portions 50 formed on one of the mountain portions 41a and another set of groove portions 50 formed on the other of the mountain portions 41a to constitute the first directional groove portions 61 that extend to one side in the sliding direction from the storage portion 51 and the second directional groove portions 62 that extend to the other side in the sliding direction from the storage portion 51, respectively.

In other words, the sliding bracket 30 sliding along the extending direction of the guide portion 25 causes the lubricant X in the groove portions 50 to be applied to the guide portion 25 on the opposite side (a rear side in the sliding direction) to the relative movement direction of the sliding bracket 30 with respect to the guide portion 25. Therefore, the configuration described above enables the lubricant X to be supplied efficiently in whichever extending direction of the guide portion 25 the sliding direction of the sliding bracket 30 is directed when the sliding bracket 30 slides with the guide portions 25. As a result, it is possible to cause the movable panel 10 to perform opening and closing movement more smoothly.

(5) Among the groove portions 50, the first directional groove portions 61 which are formed on one of the mountain portions 41a, and the second directional groove portions 62 which are formed on the other of the mountain portions 41a, are respectively formed at sets of positions that are displaced from each other in the up-and-down direction crossing the sliding direction of the sliding bracket 30.

In other words, the lubricant X in the groove portions 50, by being caused by the sliding bracket 30 repeating reciprocating sliding movement along the extending direction of the guide portion 25, while migrating between the groove portions 50 adjacent to each other in the up-and-down direction, gradually spills to an outside from the upper end side and the lower end side of the first sidewall portion 41 constituting the sliding contact surface S. However, the configuration described above enables positions at which the groove portions 50 relatively move in the sliding direction in association with sliding of the sliding bracket 30, to be set densely in a direction in which the groove portions 50 are lined up and that crosses the sliding direction. With this configuration, it is possible to use the lubricant X over a longer period.

(6) Each groove portion 50 is extended in the sliding direction of the sliding bracket 30 in such a way that opening positions P2 at extension ends of the groove portion 50 are arranged spaced further apart from the guide portion 25 than a bottom position P1 of the groove portion 50 at an apex of the mountain portion 41a on which the groove portion 50 is formed.

The configuration described above enables the lubricant X reserved in the storage portion 51 that the valley portion 41b of the first sidewall portion 41, which have a corrugated plate shape, forms, to be efficiently supplied to the groove portions 50. With this configuration, it is possible to cause the movable panel 10 to perform opening and closing movement more smoothly.

Note that the embodiment described above may be embodied by being modified as follows. The embodiment described above and the following modifications may be embodied by being combined with one another as long as they do not technically contradict one another.

In the embodiment described above, it is assumed that the sliding bracket 30 is interposed between the guide portion 25 of the panel bracket 20 and the rear link 22. However, without being limited to the above, a support member coupled to the panel bracket 20 via the sliding bracket 30 does not always have to have the same configuration as the rear link 22 as long as it is configured in such a way that the sliding bracket 30 slidably engages with the guide portion 25 of the panel bracket 20. For example, a third support member that is disposed as a separate body from the front link 21 and the rear link 22 may be used.

In the embodiment described above, the first sidewall portion 41 that comes into contact with the guide portion 25 of the panel bracket 20 from an inner side in the vehicle width direction forms the sliding contact surface S of the sliding bracket 30. It is assumed that, on the sliding contact surface S which the first sidewall portion 41 serving as a wall portion forms, the groove portions 50 are formed. However, without being limited to the above, the second sidewall portion 42 arranged on an outer side in the vehicle width direction of the guide portion 25 or the bottom wall portion 43 arranged underneath the guide portion 25 may be configured to form the sliding contact surface S having the groove portions 50.

Although it is assumed that the sliding bracket 30 has an outer shape having a substantially U-shaped cross section and engages with the guide portion 25 of the panel bracket 20 from underneath, the sliding bracket 30 may be configured to, for example, engage with the guide portion 25 from the inner side in the vehicle width direction or from the outer side in the vehicle width direction. The mode in which the sliding bracket 30 engages with the guide portion 25 of the panel bracket 20, including shapes of the guide portion 25 and the sliding bracket 30, may also be modified in any manner.

In the embodiment described above, it is assumed that the first sidewall portion 41 forming the sliding contact surface S is formed in a corrugated plate shape in which the mountain portions 41a and the valley portion 41b are alternately arranged along the sliding direction, more specifically, a corrugated plate shape in which the valley portion 41b is sandwiched between the two mountain portions 41a. However, without being limited to the above, the numbers of the mountain portions 41a and the valley portions 41b which are alternately arranged along the sliding direction may be modified in any manner. A wall portion having a flat plate shape may be configured to form the sliding contact surface S of the sliding bracket 30 with the guide portion 25.

The number and arrangement (interval) of the groove portions 50 formed on the sliding contact surface S may be modified in any manner. Further, the shape and arrangement of the storage portion 51 for the lubricant X may also be modified in any manner. For example, it may be configured in such a way that groove portions 50 extend toward one side in the sliding direction from the storage portion 51 for the lubricant X that is disposed on one end side of the sliding contact surface S. It may also be configured in such a way that, for example, a plurality of storage portions 51 are disposed on the sliding contact surface S, or the like.

Further, it may be configured in such a way that, when the lubricant X is not used, the above-described groove portions 50 are disposed on the sliding contact surface S of the sliding bracket 30 with the guide portion 25. In other words, even in such a configuration, it is possible to receive a benefit from reduction in sliding resistance due to reduction in the contact area. In this case, it may also be configured in such a way that, on the sliding surface (the first side surface 25a) on the guide portion 25 side on which the sliding bracket 30 moves in a sliding contact state, a plurality of groove portions extending in the sliding direction of the sliding bracket 30 are also formed, as with the groove portions 50 in the embodiment described above. Even when such a configuration is employed, it is possible to receive a benefit from reduction in sliding resistance due to reduction in the contact area.

Next, a technological concept that can be understood from the embodiment and modifications described above will be described.

(A) A sunroof device in which, on a sliding surface on the guide portion side on which the sliding bracket moves in a sliding contact state, a plurality of groove portions extending in an extending direction of the sliding surface are disposed. With this configuration, it is possible to achieve reduction in sliding resistance by means of reduction in contact area. As a result, it is possible to cause the movable panel to perform opening and closing movement more smoothly.

(1) A sunroof device includes a panel bracket that has a guide portion extending in an opening-and-closing movement direction of a movable panel capable of opening and closing an opening portion disposed to a roof panel and that holds the movable panel, a sliding bracket that slidably engages with the guide portion, and a support member that, while being coupled to the panel bracket via the sliding bracket and thereby changing a coupling position of the support member with the panel bracket according to an opening-and-closing movement position of the movable panel, supports the panel bracket. On a sliding contact surface of the sliding bracket with the guide portion, a plurality of groove portions extending in a sliding direction of the sliding bracket along the guide portion are disposed.

The configuration described above enables an area with which the sliding contact surface of the sliding bracket comes into contact with the guide portion of the panel bracket, to be reduced, and sliding resistance therebetween to be thereby reduced. With this configuration, it is possible to cause the movable panel to perform opening and closing movement more smoothly.

(2) In the sunroof device according to the item (1), the sunroof device may be configured in such a way that a storage portion for lubricant is disposed on the sliding contact surface, and the groove portions are formed in such a way as to extend from the storage portion.

That is, interposing the lubricant to the sliding contact surface enables sliding resistance of the sliding bracket to be further reduced. Further, the configuration described above causes the groove portions to function as supply paths for the lubricant reserved in the storage portion. With this configuration, it is possible to cause the movable panel to perform opening and closing movement more smoothly.

(3) In the sunroof device according to the item (2), the sunroof device may be configured in such a way that, on the sliding contact surface, as the groove portions, a first directional groove portion that extends toward one side in the sliding direction from the storage portion and a second directional groove portion that extends toward the other side in the sliding direction from the storage portion are disposed.

That is, the sliding bracket sliding along the extending direction of the guide portion causes the lubricant in the groove portions to be applied to the guide portion on the opposite side (a rear side in the sliding direction) to a relative movement direction of the sliding bracket with respect to the guide portion. Therefore, the configuration described above enables the lubricant to be supplied efficiently in whichever extending direction of the guide portion the sliding direction of the sliding bracket is directed when the sliding bracket slides with the guide portion. As a result, it is possible to cause the movable panel to perform opening and closing movement more smoothly.

(4) In the sunroof device according to the item (3), the sunroof device may be configured in such a way that the first directional groove portion and the second directional groove portion are formed at positions that are displaced from each other in a direction crossing the sliding direction.

That is, the lubricant in the groove portions, by being caused by the sliding bracket repeating reciprocating sliding movement along the extending direction of the guide portion, while migrating between the respective groove portions adjacent to each other in a direction crossing the sliding direction, gradually spills to an outside from a wall portion constituting the sliding contact surface. However, the configuration described above enables positions at which the groove portions relatively move in the sliding direction in association with sliding of the sliding bracket, to be set densely in a direction in which the groove portions are lined up and that crosses the sliding direction. With this configuration, it is possible to use the lubricant over a longer period.

(5) In the sunroof device according to the items (1) to (4), the sunroof device may be configured in such a way that the sliding bracket includes a wall portion that has a corrugated plate shape in which a mountain portion and a valley portion are alternately arranged in the sliding direction and forms the sliding contact surface.

The configuration described above causes the sliding bracket to engage with the guide portion with the sliding contact surface of the sliding bracket with the guide portion being in a line contact state along a line extending in a direction crossing the sliding direction of the sliding bracket with the guide portion. With this configuration, it is possible to secure a stable engagement state with the guide portion and therewith further reduce sliding resistance of the sliding bracket. As a result, it is possible to cause the movable panel to perform opening and closing movement more smoothly.

(6) In the sunroof device according to the items (2) to (4), the sunroof device may be configured in such a way that the sliding bracket includes a wall portion that has a corrugated plate shape in which a mountain portion and a valley portion are alternately arranged in the sliding direction and forms the sliding contact surface, the groove portions are formed on a mountain portion of the wall portion, a gap formed between a valley portion of the wall portion and the guide portion constitutes a storage portion for the lubricant, and each of the groove portions is extended in the sliding direction in such a way that opening positions at extension ends of the groove portion are arranged spaced further apart from the guide portion than a bottom position of the groove portion at an apex of the mountain portion.

According to the configuration described above, engagement of the sliding bracket with the guide portion in a line contact state enables a stable engagement state with the guide portion to be secured and therewith enables sliding resistance of the sliding bracket to be further reduced. It is also possible to efficiently supply the lubricant reserved in the storage portion which the valley portion of the wall portion formed in a corrugated plate shape forms, to the groove portions. With this configuration, it is possible to cause the movable panel to perform opening and closing movement more smoothly.

(7) A sunroof device includes a panel bracket that has a guide portion extending in an opening-and-closing movement direction of a movable panel capable of opening and closing an opening portion disposed to a roof panel and that holds the movable panel, a sliding bracket that slidably engages with the guide portion, and a support member that, while being coupled to the panel bracket via the sliding bracket and thereby changing a coupling position of the support member with the panel bracket according to an opening-and-closing movement position of the movable panel, supports the panel bracket. On a sliding surface on the guide portion side on which the sliding bracket moves in a sliding contact state, a plurality of groove portions extending in an extending direction of the sliding surface are disposed.

With this configuration, it is possible to achieve reduction in sliding resistance by means of reduction in contact area. As a result, it is possible to cause the movable panel to perform opening and closing movement more smoothly.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. A sunroof device comprising:
a panel bracket that has a guide portion extending in an opening-and-closing movement direction of a movable panel capable of opening and closing an opening portion disposed with respect to a roof panel and that holds the movable panel;
a sliding bracket that slidably engages with the guide portion; and
a support member that, while being coupled to the panel bracket via the sliding bracket and thereby changing a coupling position of the support member with the panel bracket according to an opening-and-closing movement position of the movable panel, supports the panel bracket, wherein
on a sliding contact surface of the sliding bracket with the guide portion, a plurality of groove portions extending in a sliding direction of the sliding bracket along the guide portion are disposed,
a storage portion for lubricant is disposed on the sliding contact surface, and
the groove portions are formed in such a way as to extend from the storage portion.

2. The sunroof device according to claim 1, wherein, on the sliding contact surface, as the groove portions, a first directional groove portion that extends toward one side in the sliding direction from the storage portion and a second directional groove portion that extends toward another side in the sliding direction from the storage portion are disposed.

3. The sunroof device according to claim 2, wherein the first directional groove portion and the second directional groove portion are formed at positions that are displaced from each other in a direction crossing the sliding direction.

4. A sunroof device comprising:
a panel bracket that has a guide portion extending in an opening-and-closing movement direction of a movable panel capable of opening and closing an opening portion disposed with respect to a roof panel and that holds the movable panel;
a sliding bracket that slidably engages with the guide portion; and
a support member that, while being coupled to the panel bracket via the sliding bracket and thereby changing a coupling position of the support member with the panel bracket according to an opening-and-closing movement position of the movable panel, supports the panel bracket, wherein
on a sliding contact surface of the sliding bracket with the guide portion, a plurality of groove portions extending in a sliding direction of the sliding bracket along the guide portion are disposed, and
the sliding bracket includes a wall portion that has a corrugated plate shape in which a mountain portion and a valley portion are alternately arranged in the sliding direction and forms the sliding contact surface.

5. The sunroof device according to claim 1, wherein the sliding bracket includes a wall portion that has a corrugated plate shape in which a mountain portion and a valley portion are alternately arranged in the sliding direction and forms the sliding contact surface, the groove portions are formed on a mountain portion of the wall portion, a gap formed between a valley portion of the wall portion and the guide portion constitutes a storage portion for the lubricant, and each of the groove portions is extended in the sliding direction in such a way that opening positions at extension ends of the groove portion are arranged spaced further apart from the guide portion than a bottom position of the groove portion at an apex of the mountain portion.

6. The sunroof device according to claim 5, wherein, on the sliding contact surface, as the groove portions, a first directional groove portion that extends toward one side in the sliding direction from the storage portion and a second directional groove portion that extends toward another side in the sliding direction from the storage portion are disposed.

7. The sunroof device according to claim 6, wherein the first directional groove portion and the second directional groove portion are formed at positions that are displaced from each other in a direction crossing the sliding direction.

8. The sunroof device according to claim 4, wherein
a storage portion for lubricant is disposed on the sliding contact surface, and
the groove portions are formed in such a way as to extend from the storage portion.

9. The sunroof device according to claim 8, wherein, on the sliding contact surface, as the groove portions, a first directional groove portion that extends toward one side in the sliding direction from the storage portion and a second directional groove portion that extends toward another side in the sliding direction from the storage portion are disposed.

10. The sunroof device according to claim 9, wherein the first directional groove portion and the second directional groove portion are formed at positions that are displaced from each other in a direction crossing the sliding direction.

* * * * *